United States Patent [19]

Bohnenkamp

[11] Patent Number: 5,035,036
[45] Date of Patent: Jul. 30, 1991

[54] ARRANGEMENT FOR MANUFACTURING STEEL STRIPS

[75] Inventor: Heinrich Bohnenkamp, Neuss, Fed. Rep. of Germany

[73] Assignee: Sms Schloemann-Siemag Aktiengesellschaft, Dusseldorf, Fed. Rep. of Germany

[21] Appl. No.: 568,340

[22] Filed: Aug. 16, 1990

[30] Foreign Application Priority Data

Aug. 17, 1989 [DE] Fed. Rep. of Germany ....... 3927189

[51] Int. Cl.⁵ .................... B21B 1/46; B21B 13/22; B22D 11/14
[52] U.S. Cl. ............................. 29/33 C; 29/527.6; 29/527.7; 72/202; 164/417
[58] Field of Search ............... 164/417, 263, 476, 477; 29/527.6, 527.7, 33 C, 33 S; 72/200, 202

[56] References Cited

U.S. PATENT DOCUMENTS

| 4,170,815 | 10/1979 | Tokitsu | 29/527.7 |
| 4,229,878 | 10/1980 | Ushijima | 29/527.7 |
| 4,918,803 | 4/1990 | DiGiusto | 29/527.7 X |
| 4,942,656 | 7/1990 | Benedetti et al. | 29/527.7 X |

FOREIGN PATENT DOCUMENTS

| 3708050 | 9/1988 | Fed. Rep. of Germany | 164/417 |
| 55-45530 | 3/1980 | Japan | 29/527.7 |
| 57-121809 | 7/1982 | Japan | 29/527.7 |
| 58-163505 | 9/1983 | Japan | 29/527.7 |
| 61-176402 | 8/1986 | Japan | 29/527.7 |

*Primary Examiner*—J. Reed Batten, Jr.
*Attorney, Agent, or Firm*—Toren, McGeady & Associates

[57] ABSTRACT

The arrangement includes one or more steel strip casting plants which are followed by a temperature equalizing furnace, a transverse conveying unit for steel strip sections and a finishing mill. The finishing mill is arranged laterally offset and in the opposite direction of the discharge direction of the steel strip casting plant. Another temperature equalizing furnace is arranged which conveys in the opposite direction of the first temperature equalizing furnace and toward the finishing mill. The temperature equalizing furnaces arranged next to each other are connected to each other by a transverse conveying unit arranged at the front end of the temperature equalizing furnaces.

8 Claims, 1 Drawing Sheet

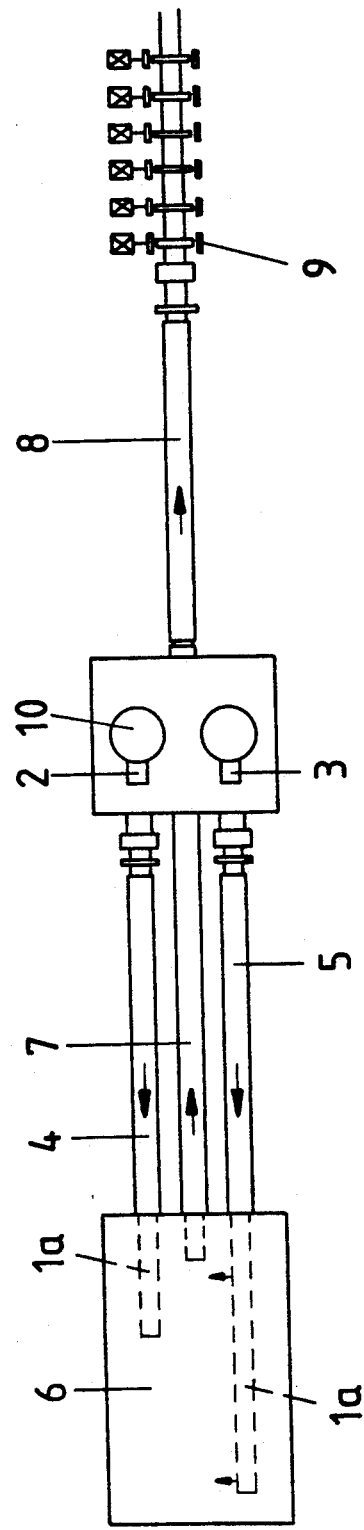
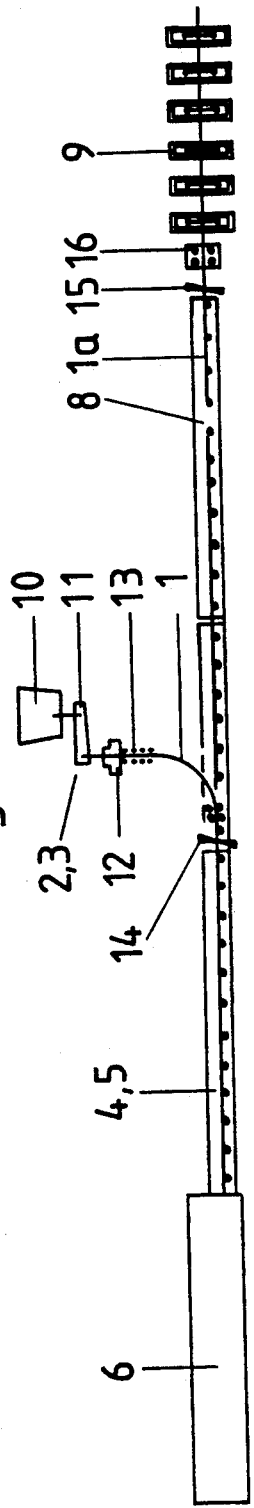

ARRANGEMENT FOR MANUFACTURING STEEL STRIPS

BACKGROUND OF THE INVENTION

1. Field of the Invention

The present invention relates to an arrangement for manufacturing steel strip which includes one or more steel strip casting plants which are followed by a temperature equalizing furnace, a transverse conveying unit for steel strip sections and a finishing mill.

2. Description of the Related Art

In a know arrangement for the manufacture of steel strip, two continuous casting plants are followed by two equalizing furnaces. A transverse conveyor for severed steel strip sections is provided at the ends of the equalizing furnaces. The transverse conveyor moves the steel strip sections in front of a temperature maintaining furnace. After passing through the temperature maintaining furnace, the steel strip sections are rolled in a finishing mill. This arrangement is expensive and requires a large space.

SUMMARY OF THE INVENTION

It is the object of the present invention to provide an arrangement for the manufacture of steel strip which requires low investment costs and little space. In addition, the temperature control of the steel strip in front of the rolling mill is to be improved.

In accordance with the present invention, the above object is met by arranging the finishing mill laterally offset and in the opposite direction of the discharge direction of the steel strip casting plant. Next to the temperature equalizing furnace which conveys in the discharge direction of the steel strip casting plant, another temperature equalizing furnace is arranged which conveys in the opposite direction and toward the finishing mill. The temperature equalizing furnaces arranged next to each other are connected to each other by means of a transverse conveying unit arranged at the front ends of the temperature equalizing furnaces.

The arrangement according to the present invention makes it possible to utilize the available space in an optimum manner. Even thought the furnace space is reduced, the temperature of the steel strip immediately in front of the rolling mill can be exactly adjusted in a relatively long furnace path which has no gaps.

In accordance with a particularly advantageous further development of the invention, when two steel strip casting plants are arranged next to each other, a series of furnaces which convey in the direction toward the rolling mill is arranged between the temperature equalizing furnaces which follow the casting plants.

In accordance with another useful feature, the series of furnaces which convey toward the rolling mill include a temperature equalizing furnace and a temperature maintaining furnace following the temperature equalizing furnace.

The temperature equalizing furnaces and the temperature maintaining furnace are advantageously constructed as roller-bottom-type furnaces.

In order to save energy, adjacent temperature equalizing furnaces can be arranged in a common furnace housing.

The transverse conveying unit may be a conveyor provided with thermally insulating hoods or a heated furnace conveyor.

In accordance with a further feature, the transverse conveying unit has an intermediate storage unit for steel strip sections.

The various features of novelty which characterize the invention are pointed out with particularity in the claims annexed to and forming a part of this disclosure. For a better understanding of the invention, its operating advantages and specific objects attained by its use, reference should be had to the drawing and descriptive matter in which there is illustrated and described a preferred embodiment of the invention.

BRIEF DESCRIPTION OF THE DRAWING

In the drawing:

FIG. 1 is a schematic top view of an arrangement for the manufacture of steel strip according to the present invention; and FIG. 2 is a side view of the arrangement of FIG. 1.

DESCRIPTION OF THE PREFERRED EMBODIMENT

The arrangement for manufacturing steel strip 1 which is schematically illustrated in the drawing includes continuous casting plants 2, 3, temperature equalizing furnaces 4, 5, transverse conveying unit 6, temperature equalizing furnace 7, temperature maintaining furnace 8 and finishing rolling mill train 9.

The continuous casting plants 2, 3 are arranged spaced apart from each other and are each equipped with foundry ladle 10, tundish 11, mold 12, and slab guide means 13. The vertically cast steel strip 1 is deflected into the horizontal and is conducted into the temperature equalizing furnaces 4, 5 which are constructed as roller-bottom-type furnaces. Shears 14 for dividing the steel strip 1 into sections 1a are provided between the continuous casting plants and the temperature equalizing furnaces.

The steel strip sections 1a are conveying from the temperature equalizing furnaces 4, 5 into the transverse conveying unit 6 and, possibly after an intermediate storage, are moved into the conveying axis of the temperature equalizing furnace 7 which conveys in the opposite direction and the steel strip sections 1a are then discharged with increased speed. The transverse conveying unit 6 may be a furnace conveyor or a transverse conveying unit with temperature maintaining hoods.

The temperature equalizing furnace 7 conveys the steel strip sections 1a in an accelerated manner out of the transverse conveying unit 6 and into the subsequently arranged temperature maintaining furnace 8. Prior to the initial pass in the finishing mill 9, a cut may be performed by crop shears 15 and descaling may be performed in descaling washer 16.

The above-described arrangement may also be realized to equal advantage with a single continuous casting plant.

While a specific embodiment of the invention has been shown and described in detail to illustrate the application of the inventive principles, it will be understood that the invention may be embodied otherwise without departing from such principles.

I claim:

1. In an arrangement for manufacturing steel strip, the arrangement including at least one steel strip casting plant, the at least one casting plant discharging steel strip in a discharge direction, the at least one casting plant being followed by a first temperature equalizing furnace, a transverse conveying unit for steel strip sections, and a finishing mill, wherein the finishing mill has a rolling direction, the improvement comprising the finishing mill being arranged laterally offset relative to the at least one casting plant, the rolling direction of the finishing mill being opposite the discharge direction of the at least one casting plant, another temperature equalizing furnace being arranged next to the first temperature equalizing furnace, the first equalizing furnace conveying strip sections in the discharge direction of the at least one casting plant, the another temperature equalizing furnace conveying strip sections in a direction opposite the discharge direction toward the finishing mill, the first temperature equalizing furnace having an exit end and the another temperature equalizing furnace having an entry end, the transverse conveying unit being arranged at the exit end of the first temperature equalizing furnace and the entry end of the another temperature equalizing furnace for connecting the temperature equalizing furnaces to each other.

2. The arrangement according to claim 1, wherein two steel strip casting plants are arranged next to each other, and the another temperature equalizing furnace and another furnace are arranged on a line extending between the casting plants.

3. The arrangement according to claim 2, wherein the another furnace on the line with the another temperature equalizing furnace is a temperature maintaining furnace.

4. The arrangement according to claim 3, wherein the temperature equalizing furnaces and the temperature maintaining furnace are roller-bottom-type furnaces.

5. The arrangement according to claim 1, wherein the temperature equalizing furnaces arranged next to each other are mounted in a common furnace housing.

6. The arrangement according to claim 1, wherein the transverse conveying unit is a conveyor with thermally insulating hood.

7. The arrangement according to claim 1, wherein the transverse conveying unit is a heated furnace conveyor.

8. The arrangement according to claim 1, wherein the transverse conveying unit includes an intermediate storage means for steel strip sections.

* * * * *

UNITED STATES PATENT AND TRADEMARK OFFICE
CERTIFICATE OF CORRECTION

PATENT NO. : 5,035,036

DATED : July 30, 1991

INVENTOR(S) : Heinrich Bohnenkamp

It is certified that error appears in the above-identified patent and that said Letters Patent is hereby corrected as shown below:

TITLE PAGE:

[73] Assignee:  SMS Schloemann-Siemag Aktiengesellschaft, Dusseldorf, Federal Republic of Germany Signed and Sealed this Nineteenth Day of January, 1993

Attest:

DOUGLAS B. COMER

Attesting Officer

Acting Commissioner of Patents and Trademarks